(12) United States Patent
Mattia et al.

(10) Patent No.: US 12,191,687 B2
(45) Date of Patent: *Jan. 7, 2025

(54) BATTERY OPERATED ONE-SHOT DEVICE MITIGATING THE EFFECTS OF LITHIUM BATTERY PASSIVATION

(71) Applicant: Action Manufacturing Company, Bristol, PA (US)

(72) Inventors: Francis Mattia, Elkins Park, PA (US); Richard Frantz, Hatboro, PA (US)

( * ) Notice: Subject to any disclaimer, the term of this patent is extended or adjusted under 35 U.S.C. 154(b) by 682 days.

This patent is subject to a terminal disclaimer.

(21) Appl. No.: 17/196,582

(22) Filed: Mar. 9, 2021

(65) Prior Publication Data
US 2021/0281104 A1 Sep. 9, 2021

Related U.S. Application Data

(60) Provisional application No. 62/986,977, filed on Mar. 9, 2020.

(51) Int. Cl.
*H02J 7/04* (2006.01)
*H02J 7/00* (2006.01)
*H02J 9/04* (2006.01)

(52) U.S. Cl.
CPC .............. *H02J 7/0031* (2013.01); *H02J 9/04* (2013.01)

(58) Field of Classification Search
CPC ....................................................... H02J 7/0031
USPC ............................................................ 320/135
See application file for complete search history.

(56) References Cited

U.S. PATENT DOCUMENTS

| | | | | |
|---|---|---|---|---|
| 5,966,002 A | * | 10/1999 | Barrieau | G08B 29/181 323/222 |
| 2002/0093311 A1 | * | 7/2002 | Stryker | G06F 1/3228 320/135 |
| 2012/0227608 A1 | * | 9/2012 | Givens | F42D 3/04 102/311 |
| 2019/0103755 A1 | * | 4/2019 | Seberger | H02J 1/10 |

* cited by examiner

*Primary Examiner* — Yalkew Fantu
(74) *Attorney, Agent, or Firm* — Ryder, Mazzeo & Konieczny LLC; Douglas J. Ryder

(57) ABSTRACT

Battery operated one-shot (energetic firing) device having logic subsystem connected to source and operated in ultra-low power idle mode during storage to continuously draw a small amount of current from power source to reduce growth of passivation layer thereon. Power switch(es) throttle application of power to other components (e.g., environmental sensing circuit, energetic fire circuit) until device is active. Power switch(es) may be mechanical switch(es) manually operated or controlled by environmental conditions or logic-controlled switch(es). Power switch(es) can be used to sequentially provide power to other components to minimize voltage dip caused by de-passivation of power source. Logic subsystem may include current pulse generator for causing a current burst to be drawn from power supply to break down passivation layer and timer for tracking time since last current burst, both operational in ultra-low power idle mode. Bursts may occur at defined intervals as required by system design and shelf-life requirements.

19 Claims, 4 Drawing Sheets

BATTERY OPERATED ONE-SHOT DEVICE MITIGATING THE EFFECTS OF LITHIUM BATTERY PASSIVATION

PRIORITY

This application claims the priority under 35 U.S.C. § 119 of Provisional Application Ser. No. 62/986,977, filed on Mar. 9, 2020, entitled "Methods of system design to mitigate the effects of lithium battery passivation in One-Shot devices" and having Francis Mattia and Richard Frantz as inventors. Application No. 62/986,977 is incorporated herein by reference in its entirety.

BACKGROUND

Battery-operated one-shot devices (e.g., energetic firing devices) are unique in that they only need to function one time. These devices can sit in storage for many years before they are used. After being dormant for a long period of time, they must be ready to become operational without any periodic testing or maintenance. When finally activated they need to properly function without delay or other startup issues.

FIG. 1 illustrates a block diagram of an example battery operated one-shot (e.g., energetic firing) device 100. The device 100 includes a power source (e.g., battery, coin cell) 110, a power switch 120, a logic subsystem (e.g., microcontroller) 130, an environmental sensing circuit 140, and an energetic fire circuit 150. The power source 110 provides power for the device 100. The power switch 120 limits the application of power from the power source 110 to when the device 100 is operational (limits the power drawn in non-operational state). The power switch 120 is a mechanical switch that closes at an appropriate time and remains closed during an entire event. The mechanical closing of the power switch 120 provides power from the power source 110 to the complete device 100 (the logic subsystem 130, the environmental sensing circuit 140, the energetic fire circuit 150). The power switch 120 may be manually closed by a user prior to system use of the device 100. The power switch 120 may be mechanically closed by some environmental property, such as acceleration due to launch of a system, associated with the device 100.

The logic subsystem 130 controls the operation of the device 100. The environmental sensing circuit 140 detects certain environmental conditions (e.g., launch, rotation, speed, altitude) that may be utilized in operation of the device 100. The energetic fire circuit 150 is to initiate an energetic device (e.g., cause device to explode) upon instructions (e.g., a fire signal) from the logic subsystem 130. In order to initiate the energetic device, the energetic fire circuit 150 needs to be charged to a certain level prior to receipt of the fire signal.

It should be noted that the device 100 may include other circuitry depending on the exact implementation of the device 100 or the system it is utilized in. For ease of illustration, the other circuitry is simply illustrated along with the environmental sensing circuit 140. While the various components of the device 100 may all be designed to operate at same voltage (provided by the power source 110), the actual operational parameters may vary. For example, some of the components may be capable of operating at a reduced voltage or a delay in application thereof may be acceptable while other components may not be able to tolerate reduction or delay. For example, the energetic fire circuit 150 may require the necessary voltage without delay to initiate the energetic device.

As with most of the electronic industry, electronic single shot devices are being forced in to smaller and smaller packages. This requires that not only must the components be reduced in size but also the battery that supplies the power. Another prevailing design objective is to reduce cost. Reducing the capacity of the battery may be one way to reduce the cost. A smaller battery has less capacity, so it is imperative that the device properly manages this capacity to get the most out of the battery.

Furthermore, new designs are expected to increase the shelf life of the devices such that they will be expected to properly function after longer periods of being dormant with no periodic testing or maintenance. These design goals, smaller size, decreased cost, and longer shelf life, must be met without compromising the reliability requirements of the device.

A major concern with lithium primary battery powered solutions is that the battery may not be capable of delivering the required power after many years of non-operation. Over time lithium primary cells, that are not being used, build up a high resistance barrier on the surface of the anode. This phenomenon is known as passivation. Passivation has the advantage of helping the battery achieve its long shelf life. However, it also has a disadvantage in that the battery cannot deliver its maximum output power when initially powered up. The current drawn by the circuit breaks down the passivation barrier and allows the current to flow. This process takes a small amount of time, often referred as the battery's voltage delay time.

FIG. 2 illustrates a chart of voltage response verses time for a typical passivated battery. The chart illustrates an operational voltage of approximately 3.5 volts and a cut-off voltage required for proper operation (acceptable level) of a device being powered thereby being approximately 3 volts. Three currents traces are documented for the typical passivated battery illustrating the voltage droop and delay time associated therewith. Trace A illustrates a low current draw which has almost no effect on battery voltage. Trace B illustrates a somewhat higher current draw, causing the voltage to dip until the passivation layer is broke down. The dip in voltage remains above the acceptable level. The time it takes to break down the passivation layer (reach the voltage drop) is known as the voltage delay time. Subsequent to the voltage delay time, the voltage increases back to the normal operational voltage.

Trace C illustrates a high enough current draw that causes the voltage to drop below the acceptable level to a transient minimum voltage (TMV) of approximately 2.5 volts at time t1. Subsequent to the voltage delay time (after t1), the voltage increases until it initially reaches the acceptable level (at time t2) and then returns to normal operational voltage (at time t3). A device drawing current along the lines of Trace C, will not be provided an acceptable voltage until t2 or an operational voltage until t3. For a component requiring an acceptable voltage before t2 or an operational voltage before t3, the passivation may diminish, if not destroy, the operation of the device 100. For example, a delay in application of an acceptable voltage by the energetic fire circuit 150 may result in the energetic fire circuit 150 not being sufficiently charged by the time the fire signal is received to initiate the energetic device.

Battery passivation needs to be mitigated in one-shot devices to ensure that the components therewith (e.g., energetic firing devices 140) operate when needed.

BRIEF DESCRIPTION OF DRAWINGS

The features and advantages of the various embodiments will become apparent from the following detailed description in which.

DETAILED DESCRIPTION

Various methods may be utilized to mitigate the effects of battery passivation including (1) continuously drawing a very small amount of current to reduce the growth of the passivation layer, (2) periodically drawing a burst of current to break down the passivation layer, and/or (3) managing current requirements when the device enters its operating mode to eliminate the effects of the voltage delay. These methods may be implemented in battery-operated one-shot devices.

A low amount of current may be continuously drawn (method 1) by simply connecting a resistive load across the battery. Such an implementation would only minimize the growth of the passivation barrier and provide no other benefit. A more practical solution would be to allow the logic subsystem 130 to remain powered in an ultra-low power state during the entire shelf life of the device. This implementation would provide the benefit of certain functionality being powered at all times for better operation. For example, certain sensing elements could be powered so the device wakes in a timely fashion when it is called into action. Such an implementation could be implemented by providing a power switch after the logic subsystem 130.

Figure 1:
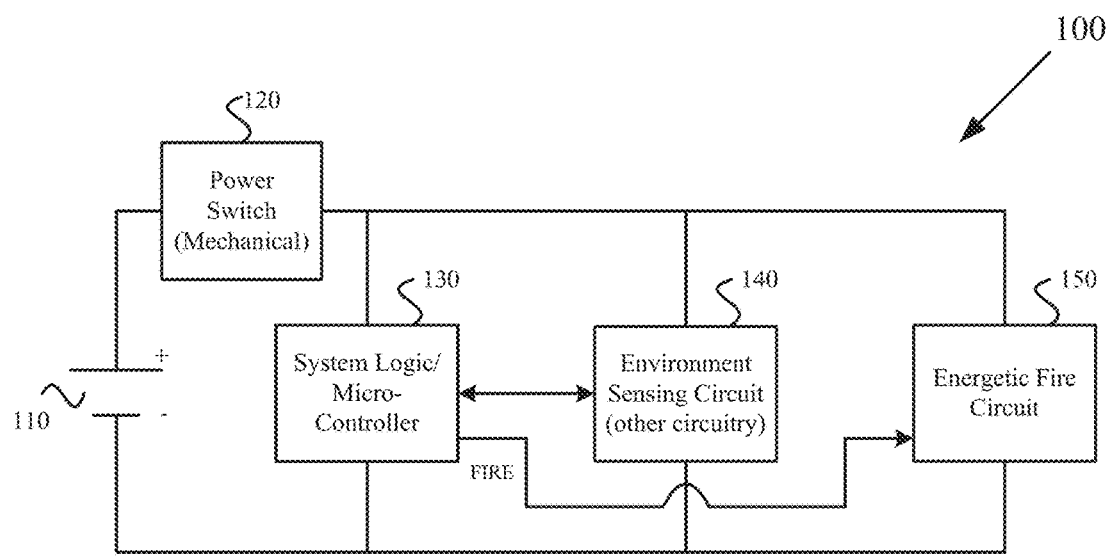
FIG. 1 illustrates a block diagram of an example battery operated one-shot device.
Figure 2:
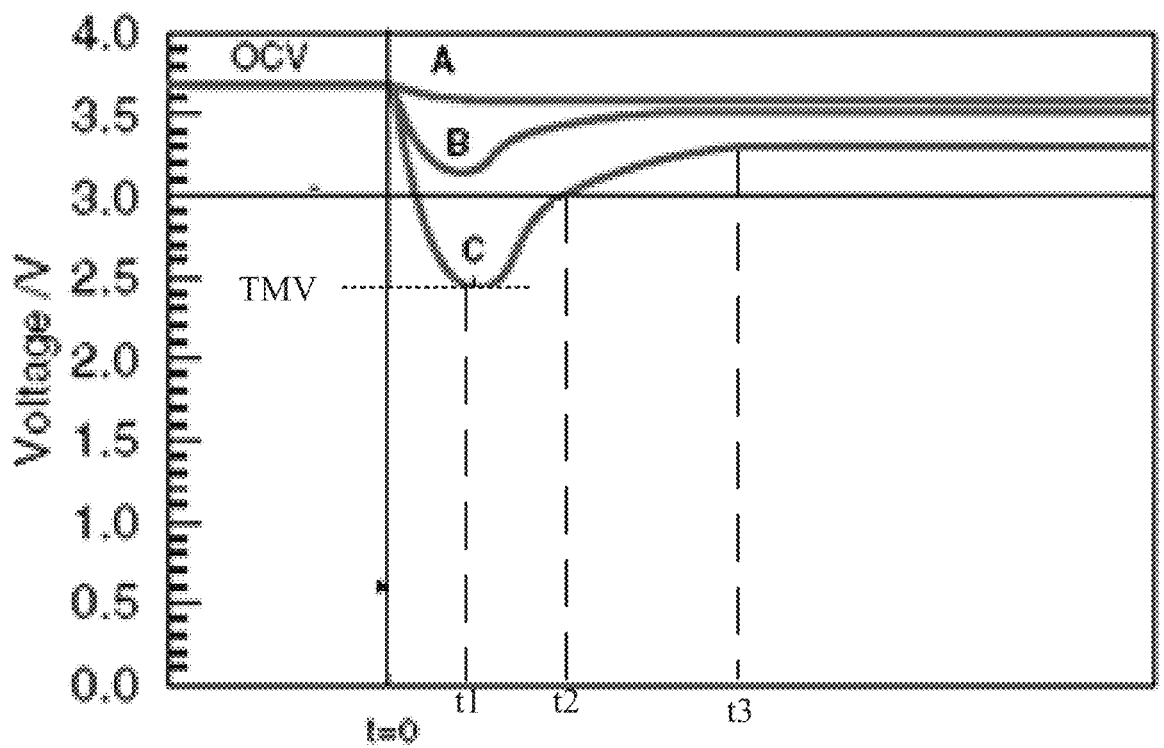
FIG. 2 illustrates a chart of voltage response verses time for a typical passivated battery.
Figure 3:
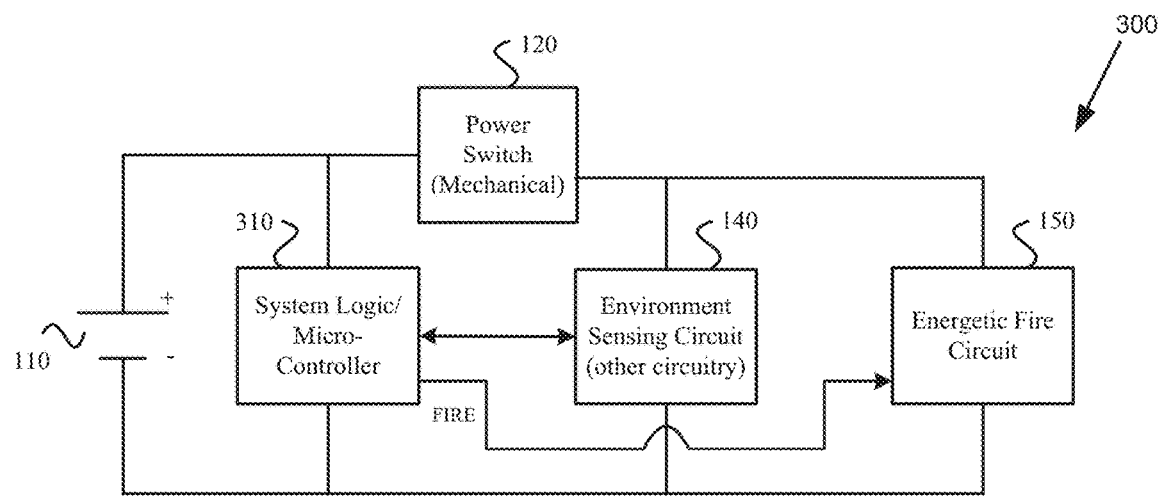
FIGS. 3-5 illustrate block diagrams of example battery operated one-shot devices for continuously drawing a low current from the battery during dormant time, according to different embodiments.

FIG. 3 illustrates a block diagram of an example battery operated one-shot (e.g., energetic firing) device 300 for continuously drawing a low current during dormant time. The device 300 includes many of the same components as the device 100 illustrated in, and discussed with respect to, FIG. 1. The difference is that a logic subsystem (e.g., microcontroller) 310 is connected to the power source 110 at all times and the power switch 120 is located after the logic subsystem 310 so that it controls application of power to the other components (the environmental sensing circuit 140, the energetic fire circuit 150). The logic subsystem 310 is placed in an ultra-low power idle mode during storage. The ultra-low power idle mode of the logic subsystem 310 continuously draws a very small amount of current from the power source 110 to reduce growth of a passivation layer for the power source 110.

The power switch 120 may be manually closed by a user prior to system use of the device 100 or may be mechanically closed by some environmental property associated with the device 100. The use of an environmentally controlled power switch may be advantageous in applications where safety is of utmost importance. Examples of an environmentally controlled power switch include an inertia sensing switch to detect a launch environment, or a spin detecting switch to detect proper flight conditions. The environmentally controlled power switch adds a degree of safety by ensuring that power cannot inadvertently be delivered to specific circuits (e.g., the energetic fire circuit 150) until an appropriate environmental condition has been detected. For example, in a device that initiates a pyrotechnic explosive it is desirable to limit the power to the energetic fire circuit 150 so that a potential un-intentional fire signal from the logic subsystem 310 does not initiate the device 300.

According to one embodiment, the power switch 120 may include a plurality of different environmentally controlled power switches in series so that power is not received by certain components (e.g., the energetic fire circuit 150) until all the environmental conditions are met for additional safety. That is, the plurality of different environmentally controlled power switches are utilized when multiple environments are required to validate the operational state of the device.

The use of multiple environmentally controlled power switches may also be used to individually provide power to different components at different times. For example, when a first environmental condition is detected power may be provided to the environmental sensing circuit 140, and when a second environmental condition is also detected power may be provided to the energetic fire circuit 150. The staggering of the application of the power in this manner may manage current requirements of the device 300 as it enters its operating mode in order to eliminate the effects of the voltage delay caused by the passivation later (method 3).

According to one embodiment, a single environmentally controlled power switch 120 may be used to control power to the device 300 and the environmental sensing circuit 140 (or other circuitry) may determine different environments and provide that information to the logic subsystem 310 which may then determine when valid operating conditions are in place (e.g., when to initiate the fire signal).

After the power switch 120 is closed, the logic subsystem 310 may switch from ultra-low current mode to normal operational mode. The logic subsystem 310 may determine the device is powered (the power switch 120 has been closed) in various manners. For example, certain sensing elements powered in the ultra-low power idle mode may determine the device 100 has woken by determining that the environmental sensing circuit 140 has been powered.

Figure 4:
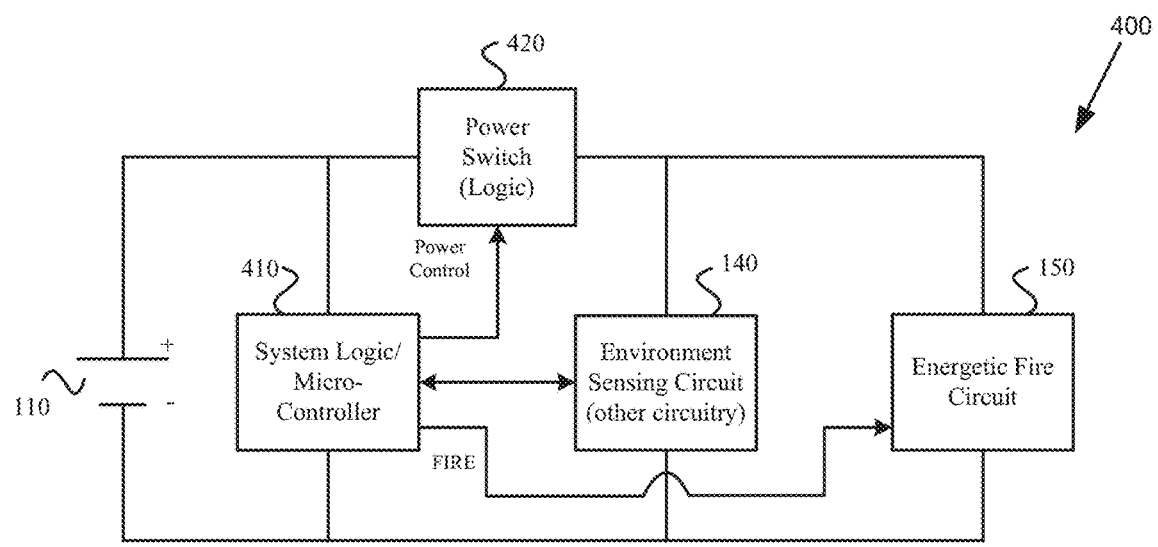

FIG. 4 illustrates a block diagram of an example battery operated one-shot device 400 for continuously drawing a low current during dormant time. The device 400 includes a logic subsystem 410 that has certain functionality enabled in an ultra-low power idle mode during storage. A power switch 420 is located after the logic subsystem 410 so that it controls application of power to the other components (the environmental sensing circuit 140, the energetic fire circuit 150). The power switch 420 may be a logic-controlled (active) power switch that acts upon instructions from the logic subsystem 410 (power control instructions as illustrated).

The logic-controlled power switch 420 may be, for example, a mechanical relay or an active semi-conductor device (e.g., optically isolated devices, filed effect transistors (FETs)). Mechanical relays and optically isolated switches typically require significant control power to energize and are therefore less attractive for use in battery operated micro-power devices. However, there might be other compelling reasons to use one of these.

FETs are well suited for use as a logic-controlled power switch 420 in the device 400 due to their low control power and small size. Metal oxide semiconductor FETs (MOSFETs) have extremely low control power and are therefore well suited for use as the power switch 420 in the device 400. The design of the active power switch 420 is important to ensure that off-state leakage current is significantly low to avoid any excessive power drain on the battery 110 and on-state current requirements can be handled.

Certain sensing elements within the logic subsystem 410 that are powered in the ultra-low power idle mode may determine when the device 400 has woken (is in an active mode). The manner in which the logic subsystem 410 powered in the ultra-low power idle mode makes this determination is not limited to any specific methodology. When the logic subsystem 410 makes this determination, it provides power control instructions to the logic-controlled power switch 420 to close the switch and power the other components. The logic subsystem 410 may switch from ultra-low current mode to normal operational mode before it closes the switch or after it closes the switch. The logic subsystem 410 may determine when to switch to normal operational in various manners.

Figure 5:
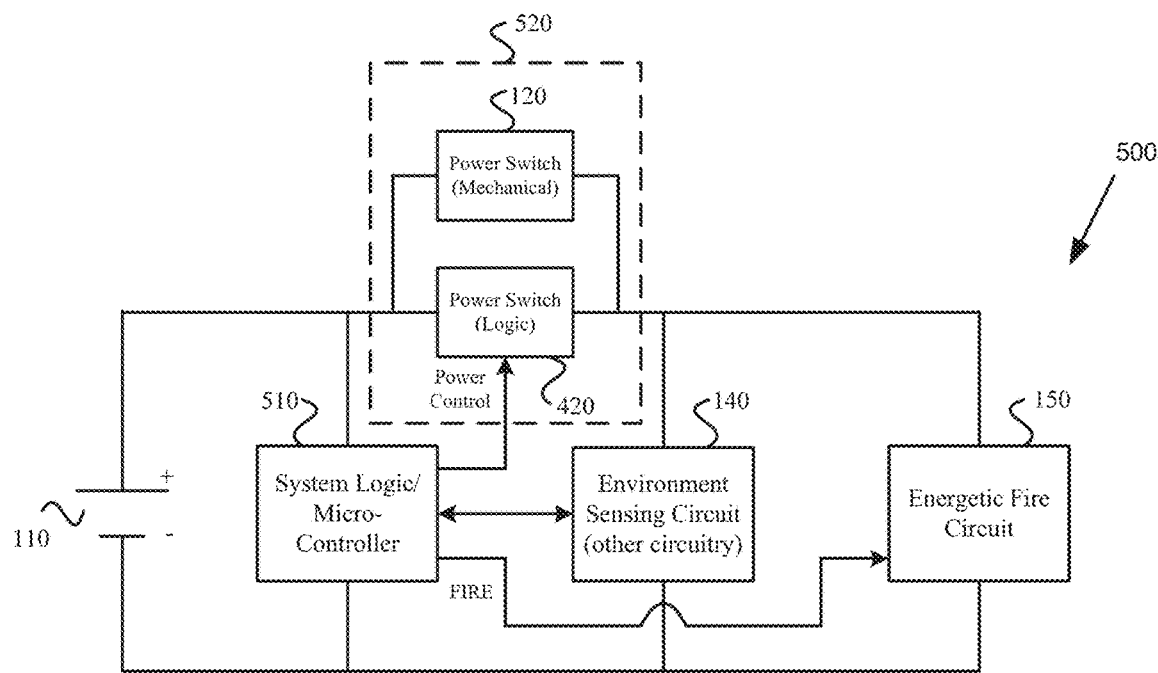

FIG. 5 illustrates a block diagram of an example battery operated one-shot device 500 for continuously drawing a low current during dormant time. The device 500 utilizes a hybrid power switching arrangement 520 that includes the environmentally controlled power switch 320 that is advantageous in applications where safety is of utmost importance and the active power switch 420 in parallel thereto. The hybrid power switching arrangement 520 may be desirable when an environment does not remain valid during entire time required to operate the device 500. For example, the device 500 may be utilized in a system where spin is used to detect proper flight environment and initiate powering of the components (140, 150) located after the hybrid switch 520, however spin might be lost in the final phases of flight due to the system hitting a target or the ground. The device 500 may need to remain operational and function for a period of time after this occurrence before initiating, for example, the energetic fire circuit 150.

For the device 500 to properly function the power must remain on during the time between the end of the environment (when the environmentally controlled switch 420 may be switched off) and final initiation of, for example, the energetic fire circuit 150. The active power switch 420 may be closed to ensure that the power is provided thereto. A logic subsystem 510 may instruct the active power switch 420 to close at an appropriate time. The logic subsystem 510 may provide the instructions, for example, after the logic subsystem 510 has switched form ultra-low current mode to normal mode, some defined time after normal operation mode, or after receiving certain information from the environmental sensing circuit 140.

FIGS. 3-5 focused on operating a logic subsystem (e.g., 310, 410, 510) in an ultra-low power idle mode during storage to continuously draw a very small amount of current from the power source 110 to reduce growth of a passivation layer for the power source 110 (method 1). A disadvantage of method 1 is that it may reduce the capacity of the battery 110 by consuming power over the entire life of the device. Accordingly, when using this technique to manage the passivation layer it is important to ensure that there is plenty of battery capacity remaining when the device is called into service.

While operating the logic subsystem in ultra-low power idle mode during storage, the logic subsystem may also be designed to periodically draw a burst of current to break down the passivation layer (method 2), and/or manage current requirements when the device enters its operating mode to eliminate the effects of the voltage delay (method 3).

Figure 6:
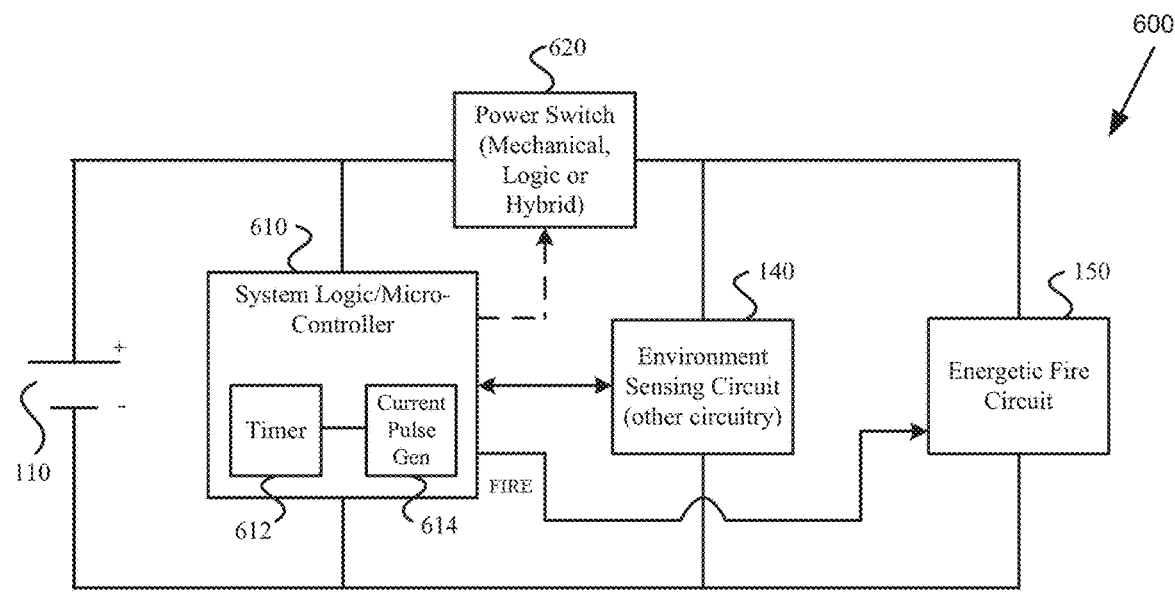
FIG. 6 illustrates a block diagram of an example battery operated one-shot device for periodically drawing a burst of current from the power source, according to one embodiment.

FIG. 6 illustrates a block diagram of an example battery operated one-shot device 600 for periodically drawing a burst of current from the power source 110. A logic subsystem 610 includes a timer 612 for tracking amount of time since last current burst (how long device has been in ultra-low power mode) and a current pulse generator 614 for causing a current burst to be drawn from the power supply 110. The timer 612 and the current pulse generator 614 are enabled when the logic subsystem 610 is operated in an ultra-low power idle mode during storage of the device 600. As with the devices 300-500, the ultra-low power idle mode of the logic subsystem 610 continuously draws a very small amount of current from the power source 110 to reduce growth of a passivation layer for the power source 110.

Periodically drawing a burst of current from the power source 110 to break down the passivation layer must be carefully controlled to ensure that there is ample capacity at the end of life for the device 600 to function when called into action. The bursts of current must satisfy the de-passivation requirements of the power source 110 without excessively impacting the required power source 110 capacity when the device is finally activated. The bursts may occur at intervals as large as days, months, or even years as required by the system design and shelf-life requirements.

The power switch 620 utilized in the device may be one or more mechanical switches 320 that are either manually switched or environmentally controlled, one or more logic-controlled (active) power switches 420 that act upon instructions from the logic subsystem, or one or more hybrid power switches 520 that may include mechanical switch(es) 320 and logic-controlled power switch(es) 420 in parallel.

Figure 7:
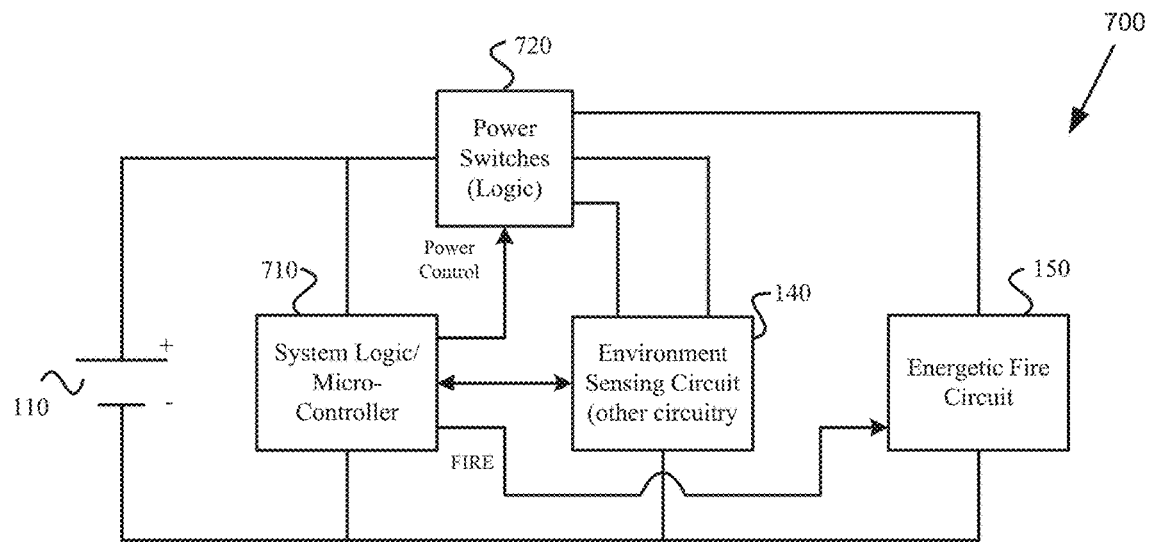
FIG. 7 illustrates a block diagram of an example battery operated one-shot device for progressively controlling device power (sequencing of power), according to one embodiment.

FIG. 7 illustrates a block diagram of an example battery operated one-shot device 700 for progressively controlling device power (sequencing of power). The device 700 includes a logic subsystem 710 that has certain functionality enabled in an ultra-low power idle mode during storage. The ultra-low power idle mode of the logic subsystem 710 continuously draws a very small amount of current from the power source 110 to reduce growth of a passivation layer. Certain sensing elements within the logic subsystem 710 that are powered in the ultra-low power idle mode may determine when the device 700 has woken (is in an active mode). The manner in which the logic subsystem 710 makes this determination is not limited to any specific methodology.

The device 700 includes a plurality of logic-controlled power switches 720 (only one box is illustrated for ease) where each switch controls power to one or more components of the device 700. When the device 700 is determined to be active, the logic subsystem 710 provides power control instructions to the logic-controlled power switches 720 to close an appropriate one or more of the switches 720 to provide power to one or more other components. The logic subsystem 710 may sequentially close the plurality of power switches 720 and accordingly sequentially power the other components (the environmental sensing circuit 140, other circuitry, the energetic fire circuit 150). For example, the sequence of closing of the plurality of logic-controlled power switches 720 may be such that the environmental sensing circuit 140 is powered, followed by the other circuitry, and then finally the energetic fire circuit 150.

The sequential powering will allow the device 700 to wake and start operating while minimizing the voltage dip caused by the de-passivation of the power source 110. The delay in activating switches 720 and providing power to corresponding components may be based on, for example, time (e.g., a defined delay), detection of certain environmental parameters, or detection of certain operational parameters. If the device 700 has the ability to monitor voltage usage thereof it can dynamically close additional switches 720 to ensure the voltage dip is not an issue.

Figure 8:
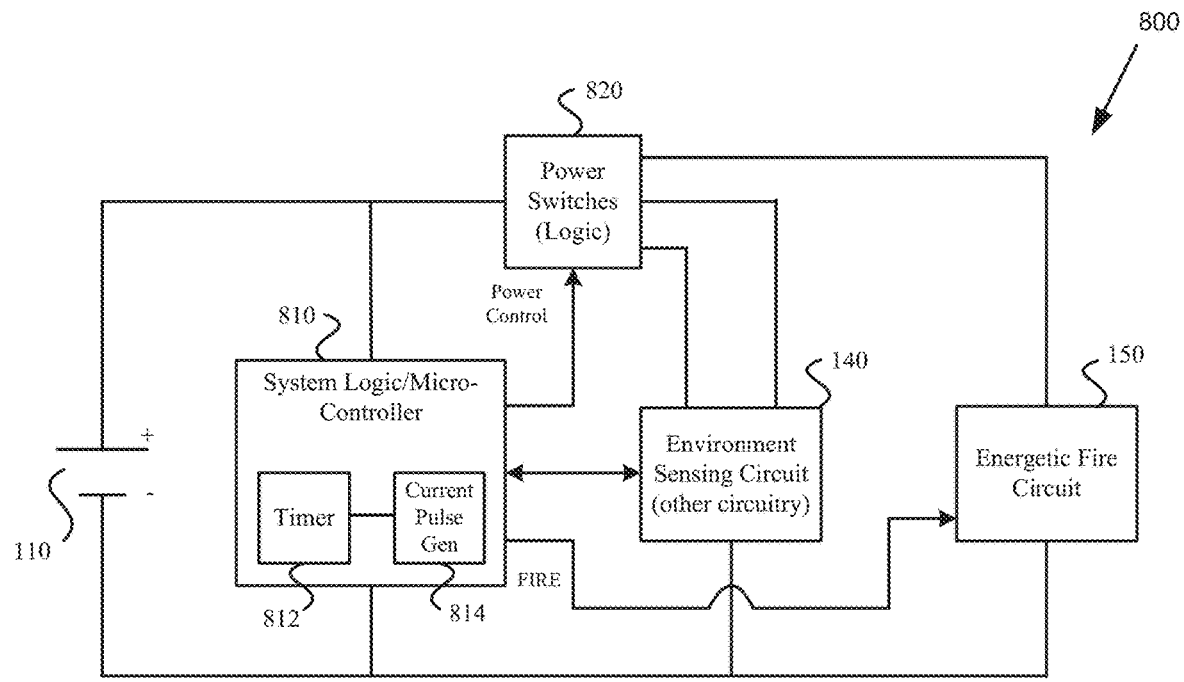
FIG. 8 illustrates a block diagram of an example battery operated one-shot device for periodically drawing a burst of current from the power source and progressively controlling device power, according to one embodiment.

FIG. 8 illustrates a block diagram of an example battery operated one-shot device 800 for periodically drawing a burst of current from the power source 110 and progressively controlling device power (sequencing of power). A logic subsystem 810 includes a timer 812 for tracking amount of time since last current burst (how long device has been in ultra-low power mode) and a current pulse generator 814 for causing a current burst to be drawn from the power supply 110 to break down the passivation layer. A plurality of logic-controlled power switches 820 (only one box is illustrated for ease) control power being provided to one or more components of the device 800 based on instructions from the logic subsystem 810 to sequentially power the device 800 while the minimizing the voltage dip caused by the de-passivation of the power source 110.

Although the disclosure has been illustrated by reference to specific embodiments, it will be apparent that the disclosure is not limited thereto as various changes and modifications may be made thereto without departing from the scope. The various embodiments are intended to be protected broadly within the spirit and scope of the appended claims.

The invention claimed is:

1. A one-shot energetic firing device to detonate when appropriate to initiate an action, wherein the device is destroyed upon detonation, the device comprising
a power source to provide an operating voltage to the device;
a logic subsystem to control operation of the device, wherein the logic subsystem is connected to the power source and operated in an idle state when the device is not active, wherein the logic subsystem draws a small amount of current from the power source when operating in the idle state to reduce growth of passivation layer on the power source;
an energetic fire circuit configured to detonate when charged by the operating voltage of the power source to at least a defined level required for detonation and provided with a fire signal from the logic subsystem; and
a power switch to throttle application of the operating voltage from the power source to the energetic fire circuit when the device is not active.

2. The device of claim 1, wherein the logic subsystem is a microcontroller.

3. The device of claim 1, wherein the power source is a battery.

4. The device of claim 1, wherein the power switch is a mechanical switch.

5. The device of claim 4, wherein the mechanical switch is manually closed by a user when the device is activated.

6. The device of claim 4, wherein the mechanical switch is an environmentally controlled power switch that is closed upon detection of certain environmental conditions.

7. The device of claim 6, wherein the environmentally controlled power switch includes at least one of an inertia sensing switch to detect a launch environment and a spin detecting switch to detect proper flight conditions.

8. The device of claim 1, wherein the power switch is a logic-controlled power switch.

9. The device of claim 8, wherein the logic subsystem controls operation of the logic-controlled switch.

10. The device of claim 1, wherein the power switch includes an environmentally controlled mechanical switch in parallel to a logic-controlled power switch.

11. The device of claim 1, wherein the logic subsystem includes a timer and a current pulse generator, wherein the timer activates the current pulse generator at defined intervals and the current pulse generator causes a current burst to be drawn from the power supply.

12. The device of claim 1, further comprising additional circuitry and wherein the power switch includes a plurality of power switches to individually control power provided to the additional circuitry and the energetic fire circuit.

13. The device of claim 12, wherein the logic subsystem increases device power usage by sequentially instructing the plurality of power switches.

14. The device of claim 1, further comprising additional circuitry and wherein
the power switch includes a plurality of power switches to individually control power provided to the additional circuitry and the energetic fire circuit; and
the logic subsystem includes a timer and a current pulse generator, wherein the timer activates the current pulse generator at defined intervals and the current pulse generator causes a current burst to be drawn from the power supply.

15. A battery operated one-shot energetic firing device to detonate when appropriate to initiate an action, wherein the device is destroyed upon detonation, the device comprising
a battery;
a logic subsystem connected to the battery and operated in an idle state when the device is not active, wherein the logic subsystem draws a small amount of current from the battery when operating in the idle state to reduce growth of passivation layer on the battery;
an environmental sensing circuit;
an energetic fire circuit configured to detonate when charged to at least a defined level required for detonation and provided with a fire signal from the logic subsystem; and
a power switch to throttle power to the environmental sensing circuit and the energetic fire circuit when the device is not active.

16. The device of claim 15, wherein the power switch is a mechanical switch that is either manually closed by a user when the device is activated or upon detection of certain environmental conditions.

17. The device of claim 15, wherein
the power switch is a logic-controlled power switch, and
the logic subsystem controls operation of the logic-controlled switch.

18. The device of claim 15, wherein the logic subsystem includes a timer and a current pulse generator, wherein the timer activates the current pulse generator at defined intervals and the current pulse generator causes a current burst to be drawn from the power supply.

19. The device of claim 15, wherein
the power switch includes at least two power switches, at least a first switch is associated with the environmental sensing circuit and at least a second switch is associated with the energetic fire circuit; and
the logic subsystem increases device power usage by sequentially instructing the plurality of power switches to power the environmental sensing circuit and the energetic fire circuit.

\* \* \* \* \*